(12) United States Patent
Piech

(10) Patent No.: US 12,005,613 B2
(45) Date of Patent: Jun. 11, 2024

(54) METHOD OF MANUFACTURING A CAN LID COMPOSED OF A COMPOSITE MATERIAL

(71) Applicant: TOP CAP HOLDING GMBH, Kufstein (AT)

(72) Inventor: Gregor Anton Piech, Reith bei Kitzbuhel (AT)

(73) Assignee: TOP CAP HOLDING GMBH, Kufstein (AT)

( * ) Notice: Subject to any disclaimer, the term of this patent is extended or adjusted under 35 U.S.C. 154(b) by 877 days.

(21) Appl. No.: 17/041,769

(22) PCT Filed: Feb. 11, 2019

(86) PCT No.: PCT/EP2019/053264
§ 371 (c)(1),
(2) Date: Sep. 25, 2020

(87) PCT Pub. No.: WO2019/185225
PCT Pub. Date: Oct. 3, 2019

(65) Prior Publication Data
US 2021/0046679 A1    Feb. 18, 2021

(30) Foreign Application Priority Data
Mar. 28, 2018   (EP) ..................................... 18164546

(51) Int. Cl.
*B29C 35/08* (2006.01)
*B21D 51/46* (2006.01)
(Continued)

(52) U.S. Cl.
CPC .......... *B29C 35/0805* (2013.01); *B21D 51/46* (2013.01); *B29C 65/46* (2013.01);
(Continued)

(58) Field of Classification Search
CPC . B29C 35/0805; B29C 65/7847; B29C 66/81; B21D 51/46
(Continued)

(56) References Cited

U.S. PATENT DOCUMENTS 3,616,047 A  * 10/1971  Kehe .................... B29C 65/3656
                                                            156/334
4,248,653 A     2/1981  Gerber
(Continued)

FOREIGN PATENT DOCUMENTS

CN           1032767 A     5/1989
CN         101946270 A     1/2011
(Continued)

OTHER PUBLICATIONS

Canadian Intellectual Property Organization. Examination Search Report for CA Application No. 3092732, mailed Apr. 27, 2022, pp. 1-3.
(Continued)

*Primary Examiner* — Nathaniel E Wiehe
*Assistant Examiner* — Thomas J Ward
(74) *Attorney, Agent, or Firm* — Vivacqua Crane, PLLC

(57) ABSTRACT

A method of manufacturing a can lid composed of a composite material comprising at least one sheet metal part, in particular an aluminum part or a tin plate part, and at least one plastic part, in particular composed of polypropylene or polyethylene terephthalate, wherein the plastic material and the sheet metal part are joined together by pressing together and by inductive heating to effect a stable connection with an effort and a manufacturing time that are as small as possible.

15 Claims, 4 Drawing Sheets

(51) Int. Cl.
  *B29C 65/00* (2006.01)
  *B29C 65/46* (2006.01)
  *B29C 65/78* (2006.01)
  *B29K 705/02* (2006.01)
  *B29L 31/56* (2006.01)

(52) U.S. Cl.
  CPC ...... *B29C 65/7847* (2013.01); *B29C 66/7422* (2013.01); *B29C 66/7426* (2013.01); *B29C 66/81* (2013.01); *B29C 2035/0816* (2013.01); *B29K 2705/02* (2013.01); *B29L 2031/565* (2013.01)

(58) Field of Classification Search
  USPC .......................................................... 219/635
  See application file for complete search history.

(56) References Cited

U.S. PATENT DOCUMENTS

| | | | |
|---|---|---|---|
| 4,397,401 A | 8/1983 | Ueno et al. | |
| 4,489,018 A | 12/1984 | Ball | |
| 4,719,739 A | 1/1988 | Foldesi | |
| 4,890,759 A | 1/1990 | Scanga et al. | |
| 5,397,225 A | 3/1995 | Knipp et al. | |
| 5,483,043 A * | 1/1996 | Sturman, Jr. | ............ B29C 35/08 219/634 |
| 8,343,402 B1 * | 1/2013 | Matsen | ..................... B22F 3/02 264/109 |
| 8,383,998 B1 | 2/2013 | Matsen et al. | |
| 2010/0159061 A1 | 6/2010 | Chen et al. | |
| 2010/0287892 A1 | 11/2010 | Gill et al. | |
| 2011/0135833 A1 * | 6/2011 | Schmitz | ............... B01J 37/0215 118/503 |
| 2013/0059048 A1 | 3/2013 | Price et al. | |
| 2018/0002065 A1 | 1/2018 | Thielen et al. | |
| 2018/0016058 A1 | 1/2018 | Thielen et al. | |

FOREIGN PATENT DOCUMENTS

| | | |
|---|---|---|
| CN | 104053603 A | 9/2014 |
| DE | 2032928 A1 | 3/1971 |
| DE | 10117979 A1 | 8/2002 |
| EP | 0036763 A1 | 9/1981 |
| JP | S4829301 A | 4/1973 |
| JP | S57142846 A | 9/1982 |
| JP | S60125643 A | 7/1985 |
| JP | H05104635 A | 4/1993 |
| JP | 2000190964 A | 7/2000 |
| JP | 2002179061 A | 6/2002 |
| JP | 2010131822 A | 6/2010 |
| KR | 1019880002074 B1 | 10/1988 |

OTHER PUBLICATIONS

Canadian Intellectual Property Organization. Examiner Requisition and Search Report for CA Application No. 3092732, mailed Dec. 20, 2022, pp. 1-4.

* cited by examiner

Section A-A

Detail D

Detail B

Detail C

METHOD OF MANUFACTURING A CAN LID COMPOSED OF A COMPOSITE MATERIAL

CROSS REFERENCE TO RELATED APPLICATIONS

This application is a national stage application under 35 U.S.C. 371 of PCT Application No. PCT/EP2019/053264 having an international filing date of 11 Feb. 2019, which PCT application claimed the benefit of European Patent Application No. 18164546.6 filed 28 Mar. 2018, the entire disclosure of each of which are hereby incorporated herein by reference.

TECHNICAL FIELD

The present invention relates to a method of manufacturing a can lid composed of a composite material and comprising at least one sheet metal part, in particular an aluminum part or a tin plate part, and at least one plastic part, in particular composed of polypropylene or polyethylene terephthalate.

INTRODUCTION

Can lids for beverage cans typically have an opening section that is separated from the remaining can lid by a weakening line and that can be moved out of the end plane via a pull member fastened thereto to open the can. The opening section can in this respect be moved into the can or can be moved upward. Reclosable can lids are also known in which a sealing frame of plastic material that is connected to the fixed end surface and that surrounds the opening region is connected to the metal end region surrounding the opening region. A closure unit that is connected to the metal opening section of the can lid that can be pivoted open cooperates with the sealing frame. The sealing frame and the closure unit preferably consist of plastic and the can lid consists of aluminum or tin plate. Similar can lids are used for foodstuff cans. It has also become known that a microgap is provided between the opening section and the fixed can region instead of the weakening line. In this case, the can lid is coated inwardly by a plastic film to cover the microgap in a sealing manner. The plastic film is also pulled open on the opening of the can lid, for which purpose the plastic film can likewise be provided with a weakening line.

SUMMARY

It is the underlying object of the invention to provide a method of manufacturing such a can lid that is as simple and as inexpensive as possible.

This object is satisfied in that the plastic part and the sheet metal part are joined together by being pressed together and by inductive heating.

The plastic part is partly melted by the inductive heating and is thereby connected to the sheet metal part with material continuity. Inductive heating has the advantage here that only the sheet metal part is directly heated since eddy currents can be generated only in the sheet melt part due to the induction. In contrast, the plastic part is indirectly heated by the metal part, whereby the side of the plastic part contacting the sheet metal part is in particular partly melted.

The sheet metal part and/or the plastic part is/are preferably coated with a bonding agent prior to the joining. The stability of the join connection can thereby be increased. The bonding agent preferably includes the same plastic as the plastic part to be connected to the sheet metal part. A particularly good adhesion hereby results and thus a particularly firm join connection.

A completely formed can lid element of sheet metal is particularly preferably joined together with a plastic film having an adapted shape, in particular a thermally shaped plastic film. A particularly firm join connection is also hereby achieved. In addition, the join connection can be established with relatively little energy effort since a matching deformation of the plastic part during the joining is not required.

To manufacture a reclosable can lid, the can lid element is joined in accordance with a further embodiment of the invention together with a plastic film on its one side and to a closure element on its other side that covers the opening region of the can lid and that comprises a sealing frame and a closure unit that can be pivoted open, with the closure unit in particular comprising injection molded plastic, in particular polypropylene or polyethylene terephthalate. Both joining processes preferably take place in one workstep here. The joining process can thereby be carried out particularly fast and simply. Energy is additionally saved since the sheet metal part of the can lid only has to be heated once.

In accordance with a preferred embodiment of the invention, a press is used for the joining process that has a top tool and a bottom tool as well as a hollow conductor for supplying the electromagnetic alternating field into the region of the can lid for its inductive heating, with the top tool having a shape reciprocal to one side of the can lid and the bottom tool having a shape reciprocal to the other side of the can lid. A particularly good join connection can be established using such an apparatus. The parts to be joined are pressed together by the press so that they are in intimate contact. The electromagnetic alternating field is conducted into the region of the can lid via the hollow conductor and heats the sheet metal part whose heat in turn results in the partial melting of the plastic contacting the sheet metal part.

The hollow conductor particularly preferably has a plurality of ring-shaped or spiral sections that are disposed opposite the joining region of the can lid, in particular a ring-shaped region in the marginal region of the can lid and a spiral region having two, three, or more windings in the middle end region. An advantageous heating of the sheet metal part can be achieved by this design, in particular in the critical marginal region due to the separate ring-shaped region of the hollow conductor.

In accordance with a further advantageous embodiment of the invention, the tool located at the side of the hollow conductor comprises largely shape-stable material, in particular plastic, and the oppositely disposed tool comprises elastic material, in particular elastomeric material. The hollow conductor is safely protected from forces that may occur by the shape-stable material on the side of the hollow conductor. The elastic material on the oppositely disposed side, on the other hand, enables a compensation of production tolerances so that no forces that are too high are produced thereby on the pressing together of the parts.

The largely shape-stable tool is preferably associated with the plastic film. It can additionally preferably be provided with ribs for the introduction of a weakening line into the plastic film during the joining process. A workstep in the manufacture of a can lid can hereby be saved.

In accordance with a likewise preferred embodiment of the invention, the parts to be joined are held together by vacuum during the joining process. An exact fit joining can thereby be ensured. In addition, an advantageous venting is produced that prevents the enclosure of air bubbles between the plastic material and the sheet metal part. With can lids having a microgap between the opening section and the fixed end region, the venting can act on both sides of the end.

It is in particular advantageous for the manufacture of can lids without a microgap to provide at least one of the tools with indentations to produce free spaces that are formed for the reception of possibly enclosed air. Such indentations can preferably be provided in those regions in which enclosed air bubbles are not disruptive, for example in the middle end region with a sufficient spacing from the end margin and from the opening region.

In accordance with a further embodiment of the invention, a rotary indexing table is used to bring the individual elements of the can lid together for the joining process. An advantageous equipping of a press used during joining can thus be achieved.

In accordance with a preferred further development, the rotary indexing table has a vacuum supply for at least one charging station, with the vacuum supply of the individual stations taking place via valves that are actuated by a round distributor. This is particularly advantageous with respect to the distribution of the vacuum.

BRIEF DESCRIPTION OF THE DRAWINGS

An embodiment of the invention is represented in the drawing and will be described in the following. There are shown, schematically in each case.

DETAILED DESCRIPTION

Figure 1:
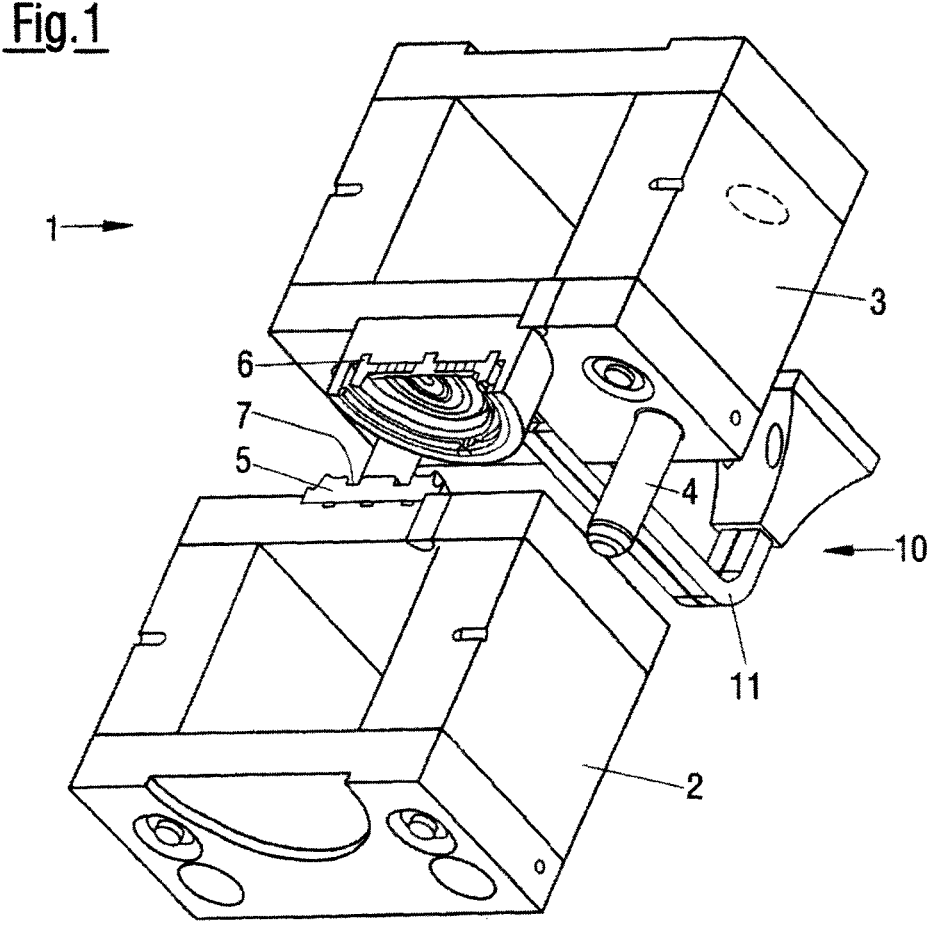
FIG. 1 is a sectioned, perspective view of a press for use in a method in accordance with the invention.
Figure 6:
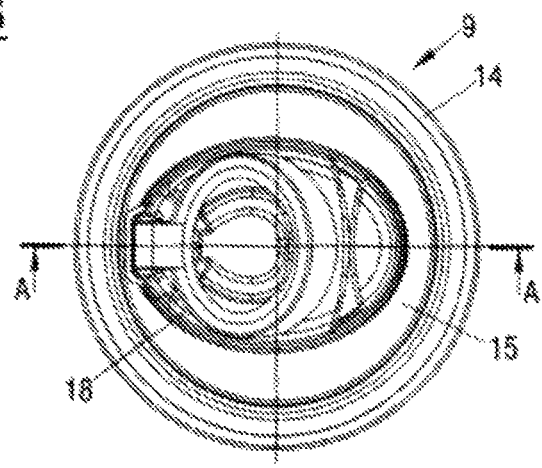
FIG. 6 is a plan view of a can lid.
Figure 7:
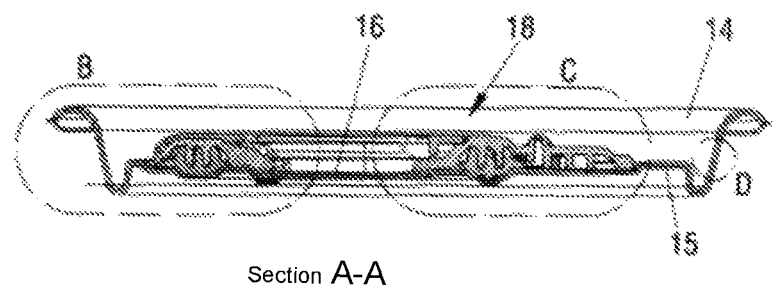
FIG. 7 is a cross-section through the can lid of FIG. 6.
Figure 10:
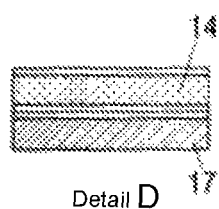
FIG. 10 is a detail D of FIG. 7.
Figure 8:
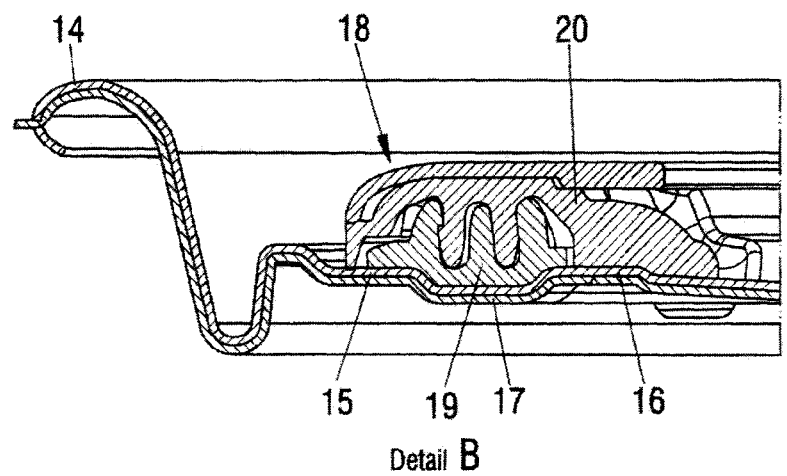
FIG. 8 is a detail B of FIG. 7.
Figure 9:
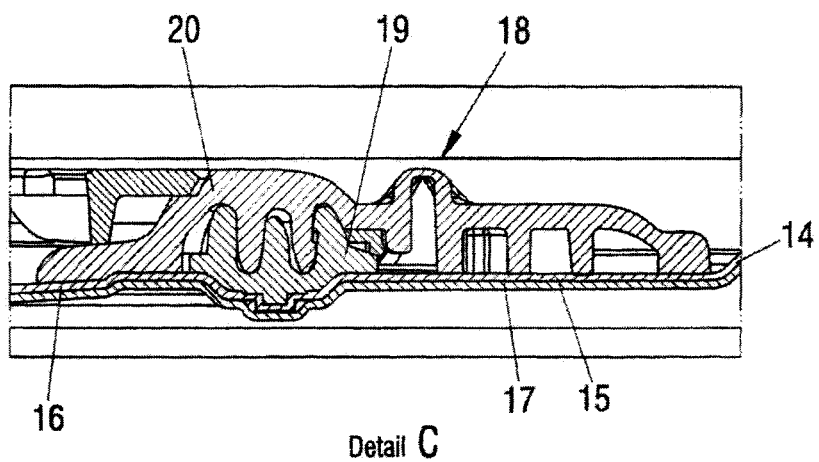
FIG. 9 is a detail C of FIG. 7.

The press 1 shown in FIG. 1 comprises a lower rack 2 and an upper press part 3 movable relative thereto as well as guide cylinders 4 for guiding the upper press part 3 on the opening and closing of the press. A bottom tool 5 is provided at the upper side of the lower rack 2 and a top tool 6 is provided at the lower side of the upper press part 3. The bottom tool 5 comprises an elastomeric material and has a cavity 7 for receiving a closure element 18 (see FIG. 6) of a can lid 9. In another respect, the bottom tool 5 replicates the shape of the upper side of the can lid 9. The top tool 6 comprises a largely stable-shape plastic and replicates the lower side of the can lid 9.

Figure 2:
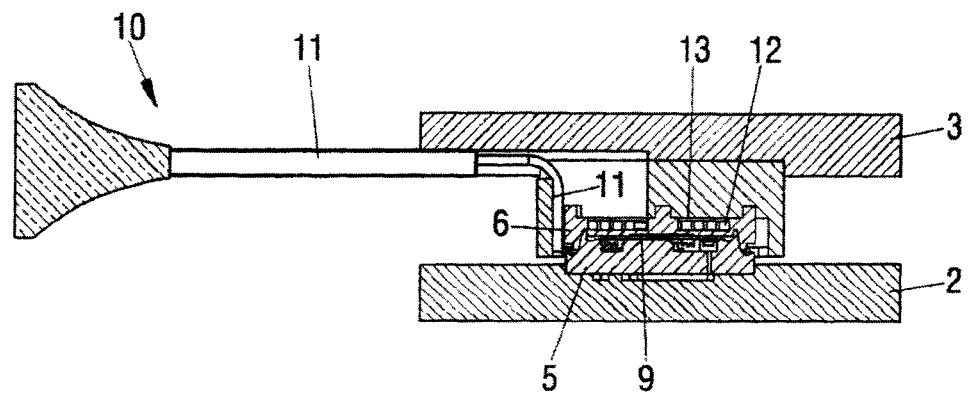
FIG. 2 is a sectioned side view of a part of the press in accordance with the invention.
Figure 3:
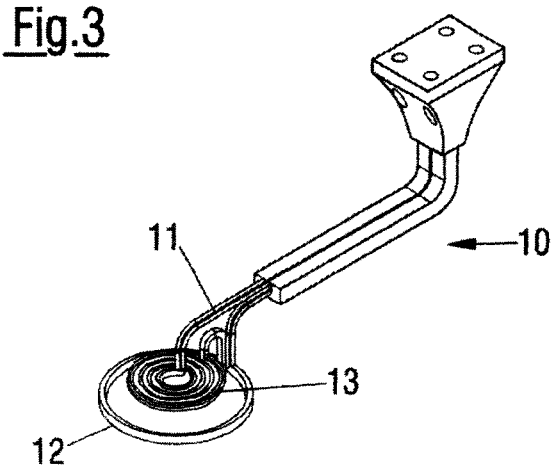
FIG. 3 is a perspective view of an inductor to be used in the apparatus of FIG. 1.
Figure 4:
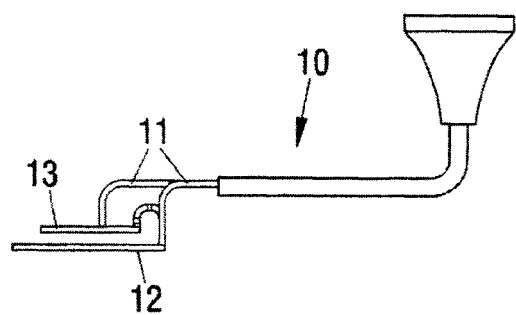
FIG. 4 is a side view of the inductor of FIG. 3.
Figure 5:
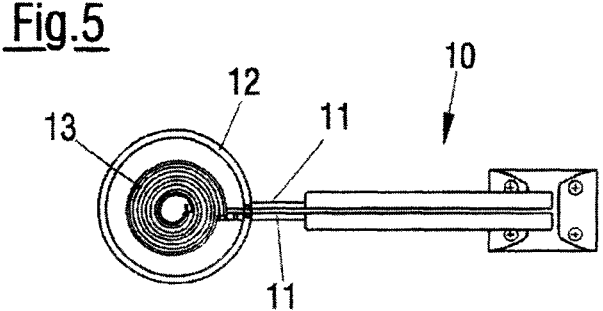
FIG. 5 is a plan view of the inductor of FIG. 3.

An inductor 10 is arranged in the region of the press. Hollow conductors 11 for supplying an electromagnetic alternating field are guided into the region of the top tool 6 starting from the inductor 10. As can in particular be seen in FIGS. 3 to 5, the hollow conductors that in particular consist of copper are shaped to form an outer ring 12 and a spiral 13 arranged within the ring and having a plurality of windings. As can in particular be seen in FIG. 2, the outer ring 12 and the spiral 13 are arranged above the top tool 6. They thereby lie opposite the surface of the can lid 9 to be joined. The copper hollow conductors 11 are in particular water-cooled.

The can lid 9 shown in FIGS. 6 to 9 comprises a base body 14 composed of a sheet metal, in particular aluminum or tin plate. The base body 14 comprises a fixed metallic end region 15 and an upwardly pivotable opening section 16 to release an opening region 8. As can in particular be seen in FIGS. 8 and 9, the lower side of the can lid 9 is laminated with a plastic film 17. In contrast, a closure element that comprises a sealing frame 19 and a closure unit 20 is arranged on the upper side of the can lid 9. The sealing frame 19 is connected to the fixed end region 15 and the closure unit 20 is connected to the upwardly pivotable opening section 16.

The method in accordance with the invention can be used to manufacture the can lid 9 shown in FIGS. 6 to 9 while using the apparatus shown in FIGS. 1 to 5. For this purpose, the closure element 18 that is in particular produced in one piece in a deep-drawing process is placed into the bottom tool 5 such that the side facing the can lid 9 faces upward. The base body 14 that had previously had the plastic film 17 applied to its lower side is placed onto the closure element 18. The press 1 is then closed and the induction heating 10 is switched on.

The metallic base body 14 is heated by the supplied energy in that electromagnetic eddy currents are produced therein. The heated base body 14 in turn heats the plastic film 17 and the closure element 18 that are thereby partially melted. A plastic weld connection is thereby produced between the metallic base body 14 and the plastic film 17, on the one hand, and the closure element 18, on the other hand, with a bonding agent preferably being used to improve the plastic weld connection. The bonding agent can here include the same plastic that is used for the plastic film 17 or for the closure element 18. It can here in particular be polypropylene or polyethylene terephthalate.

The top tool 6 can additionally have ribs which are not recognizable here and by which a weakening line is introduced into the plastic film 17 during the pressing and joining procedure. In addition, indentations can be provided in the top tool 6 to generate free spaces between the plastic film 17 and the metallic base body 14. Enclosed air can hereby be collected in predefined regions of the can lid 9, in particular in regions in which air bubbles are not disruptive such as in the region between the margin of the can lid and its opening region 8. Additionally or alternatively, the press 1 can be provided with a vacuum supply that, on the one hand, holds the parts to be joined together and, on the other hand, can at least largely prevent an enclosure of air. With can lids having a microgap between the fixed end region 15 and the opening section 16 that can be pivoted open, this applies to both sides of the can lid.

A rotary indexing table can be provided for the equipping of the press 1 that has a plurality of stations for putting together the individual parts of the can lid. However, a linear supply for the press 1 can also be provided instead of a rotary indexing table.

After the welding of the plastic film 17 and the closure element 18 to the metallic base body 14 has taken place, the press is opened and the finished can lid 9 is removed.

REFERENCE NUMERAL LIST 1 press
2 lower rack
3 upper press part
4 guide cylinder 5 bottom tool
6 top tool
7 cavity
8 opening region
9 can lid
10 inductor
11 hollow conductor
12 outer ring
13 spiral
14 base body
15 fixed end region
16 opening section
17 plastic film
18 closure element
19 sealing frame
20 closure unit

The invention claimed is:

1. A method of manufacturing a can lid for a can, wherein the can lid is composed of a composite material comprising at least one sheet metal part and at least one plastic part, wherein the at least one sheet metal part has an upper side facing an exterior of the can and a lower side facing an interior of the can, wherein the at least one plastic part is joined to the lower side of the at least one sheet metal part by a joining process including pressing together and inductive heating, wherein a cross-sectional height profile of the at least one plastic part is adapted to a cross-sectional height profile of the at least one sheet metal part before the joining process, and wherein the at least one plastic part includes a plastic film.

2. The method in accordance with claim 1, wherein at least one of the sheet metal part and the plastic part is coated with a bonding agent before the joining process.

3. The method in accordance with claim 2, wherein the bonding agent includes a same plastic as the plastic part to be connected to the sheet metal part.

4. The method in accordance with claim 1, wherein the at least one sheet metal part further includes a closure element disposed on the upper side of the at least one sheet metal part, and wherein the closure element covers an opening region of the can lid.

5. The method in accordance with claim 4, wherein both joining processes take place in one workstep.

6. The method in accordance with claim 4, wherein the closure element is composed of an injection molded plastic.

7. The method in accordance with claim 6, wherein the injection molded plastic comprises one of polypropylene and polyethylene terephthalate.

8. The method in accordance with claim 1, wherein a press is used for the joining process having a top tool and a bottom tool as well as a hollow conductor for supplying an electromagnetic alternating field into a region of the can lid for its inductive heating, with the top tool having a shape reciprocal to a top side of the can lid and the bottom tool having a shape reciprocal to a bottom side of the can lid.

9. The method in accordance with claim 8, wherein the hollow conductor comprises a section that is disposed opposite a reception region of the can lid to be joined.

10. The method in accordance with claim 9, wherein the top tool located proximal to the hollow conductor comprises largely shape-stable material, and the bottom tool comprises elastic material.

11. The method in accordance with claim 10, wherein the top tool comprising largely shape-stable material is associated with the plastic film.

12. The method in accordance with claim 9, wherein the hollow conductor comprises a ring-shaped region in a marginal region of the can lid and a spiral region disposed within the ring-shaped region and having two, three, or more windings in a middle region of the can lid.

13. The method in accordance with claim 1, wherein the at least one sheet metal part and the at least one plastic part are held together by vacuum during the joining process.

14. The method in accordance with claim 1, wherein the at least one sheet metal part comprises one of an aluminum part and a tin plate part.

15. The method in accordance with claim 1, wherein the at least one plastic part is composed of one of polypropylene and polyethylene terephthalate.

* * * * *